United States Patent
Stevens et al.

(10) Patent No.: US 11,236,777 B2
(45) Date of Patent: Feb. 1, 2022

(54) FRICTION FIT ELECTROMAGNETIC EFFECT PROTECTION CAP SYSTEM

(71) Applicant: THE BOEING COMPANY, Chicago, IL (US)

(72) Inventors: Bart Stevens, Summerville, SC (US); Daniel J. Cowan, North Charleston, SC (US); Sean Auffinger, Ladson, SC (US)

(73) Assignee: THE BOEING COMPANY, Chicago, IL (US)

(*) Notice: Subject to any disclaimer, the term of this patent is extended or adjusted under 35 U.S.C. 154(b) by 253 days.

(21) Appl. No.: 16/403,842

(22) Filed: May 6, 2019

(65) Prior Publication Data

US 2020/0355215 A1    Nov. 12, 2020

(51) Int. Cl.
*F16B 37/14*    (2006.01)
*F16B 33/00*    (2006.01)

(52) U.S. Cl.
CPC ............ *F16B 37/14* (2013.01); *F16B 33/004* (2013.01)

(58) Field of Classification Search
CPC ...... F16B 33/004; F16B 37/14; F16B 41/005; Y10S 411/91; Y10S 411/91
USPC ........................... 411/372.5, 372.6, 373, 910
See application file for complete search history.

(56) References Cited

U.S. PATENT DOCUMENTS

| | | |
|---|---|---|
| 1,368,637 A | 2/1921 | McFarland |
| 1,868,084 A | 7/1932 | Wheelwright |
| 3,362,280 A * | 1/1968 | Muller ................ F16B 21/073 411/373 |
| 3,699,368 A | 10/1972 | Palmer |
| 4,013,190 A | 3/1977 | Wiggins et al. |
| 4,295,766 A | 10/1981 | Shaw |
| 4,519,974 A | 5/1985 | Bravenec et al. |
| 4,630,168 A | 12/1986 | Hunt |
| 4,636,446 A | 1/1987 | Lee |
| 4,826,380 A | 5/1989 | Henry |
| 4,850,778 A | 7/1989 | Clough et al. |
| 4,884,933 A | 12/1989 | Preusker et al. |

(Continued)

FOREIGN PATENT DOCUMENTS

| | | |
|---|---|---|
| CA | 2856687 A1 | 3/2015 |
| CA | 2858461 A1 | 3/2015 |

(Continued)

OTHER PUBLICATIONS

Color Photographs of Boeing Proprietary, Zap Cap Further Screening Test Plan for 787 Fuel Tank Use, Mar. 24, 2016, 2 pg.

(Continued)

*Primary Examiner* — Roberta S Delisle
(74) *Attorney, Agent, or Firm* — Marshall, Gerstein & Borun LLP

(57) ABSTRACT

A protective seal cap assembly for enclosing an end portion of a fastener extending through a structure, which includes a cap member. The cap member includes a sidewall which defines an opening and defines an interior space within the sidewall and aligned with the opening, wherein the sidewall defines a central axis. The cap member further includes at least one rib which extends away from an interior surface of the sidewall within the interior space and extends in a direction along the central axis of the cap member.

21 Claims, 7 Drawing Sheets

(56) References Cited

U.S. PATENT DOCUMENTS

| | | | |
|---|---|---|---|
| 5,082,409 A * | 1/1992 | Bias | F16B 37/14 411/372.5 |
| 5,108,853 A | 4/1992 | Feres | |
| 5,350,266 A | 9/1994 | Espey et al. | |
| 5,752,794 A | 5/1998 | Krawczak | |
| 5,857,818 A * | 1/1999 | Bias, Sr. | F16B 37/14 411/431 |
| 6,053,683 A | 4/2000 | Cabiran | |
| 6,102,128 A | 8/2000 | Bridgeman | |
| 6,238,158 B1 * | 5/2001 | Clements | F16B 37/14 411/372.6 |
| 6,318,942 B1 | 11/2001 | Wieczorek | |
| 7,134,666 B2 | 11/2006 | Beyssac et al. | |
| 7,755,876 B2 | 7/2010 | Morrill et al. | |
| 7,918,081 B2 | 4/2011 | Schlichting et al. | |
| 7,936,550 B2 | 5/2011 | Morrill et al. | |
| 8,318,942 B2 | 11/2012 | Zhang | |
| 8,388,293 B2 | 3/2013 | Hutter, III | |
| 8,711,541 B2 | 4/2014 | Umemoto et al. | |
| 8,717,735 B2 | 5/2014 | Day et al. | |
| 8,717,736 B2 | 5/2014 | Asahara et al. | |
| 8,840,740 B2 | 9/2014 | Rorabaugh et al. | |
| 8,894,338 B2 | 11/2014 | Dobbin et al. | |
| 9,033,633 B2 * | 5/2015 | Henry | A47K 11/00 411/429 |
| 9,039,339 B2 * | 5/2015 | Kuhm | F16B 37/0842 411/437 |
| 9,133,874 B2 | 9/2015 | Hill | |
| 9,188,226 B2 | 11/2015 | Pajel et al. | |
| 9,228,604 B2 | 1/2016 | Dobbin | |
| 9,764,854 B2 | 9/2017 | Dobbin et al. | |
| 10,151,337 B2 | 12/2018 | Hill | |
| 11,022,164 B2 * | 6/2021 | Roper | F16B 33/004 |
| 2002/0192052 A1 | 12/2002 | Ruspa | |
| 2008/0137259 A1 | 6/2008 | Heeter et al. | |
| 2009/0194297 A1 | 8/2009 | Ortiz Teruel | |
| 2010/0303582 A1 | 12/2010 | Choi et al. | |
| 2012/0217673 A1 | 8/2012 | Hutter, III | |
| 2013/0206759 A1 | 8/2013 | Wurz et al. | |
| 2013/0223951 A1 | 8/2013 | Bessho et al. | |
| 2014/0048198 A1 | 2/2014 | Dobbin et al. | |
| 2014/0261956 A1 | 9/2014 | Wiseman et al. | |
| 2014/0341675 A1 | 11/2014 | Dobbin | |
| 2015/0060465 A1 | 3/2015 | Limbacher et al. | |
| 2015/0082603 A1 | 3/2015 | Rawdon et al. | |
| 2015/0086295 A1 | 3/2015 | Cameron et al. | |
| 2015/0184688 A1 | 7/2015 | Dobbin et al. | |
| 2015/0345533 A1 | 12/2015 | Hill | |
| 2016/0131179 A1 | 5/2016 | Prouty et al. | |
| 2016/0195125 A1 * | 7/2016 | Dobbin | B64D 45/02 411/82.1 |
| 2017/0021209 A1 | 1/2017 | Damazo et al. | |
| 2017/0050746 A1 | 2/2017 | Dobbin | |
| 2019/0241276 A1 | 8/2019 | Dobbin | |

FOREIGN PATENT DOCUMENTS

| | | |
|---|---|---|
| DE | 1085586 B | 7/1960 |
| EP | 2610506 A1 | 7/2013 |
| EP | 2698318 A2 | 2/2014 |
| EP | 2713065 A2 | 4/2014 |
| EP | 2812248 A1 | 12/2014 |
| EP | 2860410 A1 | 4/2015 |
| EP | 2860411 A1 | 4/2015 |
| EP | 2996941 A1 | 3/2016 |
| EP | 3027917 A1 | 6/2016 |
| EP | 3059170 A1 | 8/2016 |
| EP | 3106380 A1 | 12/2016 |
| EP | 3287362 A1 | 2/2018 |
| EP | 3462046 A1 | 4/2019 |
| EP | 3546374 A1 | 10/2019 |
| GB | 612381 A | 11/1948 |
| JP | H02102910 A | 4/1990 |
| JP | H03125911 U | 12/1991 |
| JP | H08-145032 A | 6/1996 |
| JP | 2000039010 A | 2/2000 |
| JP | 2001165138 A | 6/2001 |
| JP | 2002266832 A | 9/2002 |
| JP | 2004169853 A | 6/2004 |
| RU | 2014128760 A | 2/2016 |
| WO | WO-9729289 A1 | 8/1997 |
| WO | WO-0057069 A1 | 9/2000 |
| WO | WO-2009063063 A1 | 5/2009 |
| WO | WO-2012147645 A1 | 11/2012 |
| WO | WO-2012170672 A1 | 12/2012 |
| WO | WO-2013117756 A1 | 8/2013 |
| WO | WO-2013178985 A1 | 12/2013 |
| WO | WO-2014118117 A1 | 8/2014 |
| WO | WO-2014118510 A1 | 8/2014 |
| WO | WO-2014184722 A1 | 11/2014 |
| WO | WO-2015015153 A1 | 2/2015 |
| WO | WO-2015025130 A1 | 2/2015 |

OTHER PUBLICATIONS

Extended EP Search Report for EP Application No. 19204019.4 dated Mar. 30, 2020.
Written Opinion for EP Application No. 19204019.4 dated Mar. 30, 2020.
EP Search Report for Application No. EP14175808 dated Mar. 6, 2015.
PRC-Desoto International, Inc., "Technical Data Sheet Aerospace Sealants Customized Sealant Solutions PRC(R) Seal Caps," May 1, 2017, Lit, #4086, Sylmar, CA, pp. 1-2; retrieved on Dec. 4, 2018, retrieved from internet: http://www.ppgaerospace.com/getmedia/9a234ec3-1db9-48de-94f7-c212ac2ba705/SealCapFlyer.pdf.aspx.
Porex Corporation, "Porex(R) Battery Vents—Flame Arrestors," Porex Advanced Porous Materials, PXT-621-080513-00, Jan. 1, 2013, pp. 1-2, retrieved on Dec. 4, 2018, retrieved from internet: http://www.porex.com//files/documents/POREX-Battery-Vents--Letter-for-Web.pdf.
"Customized Sealants Solutions: PRC® Seal Caps," PPG Aerospace, product literature downloaded from ppaerospace.com on Sep. 7, 2016.
"HRL Researchers Develop World's Lightest Material," downloaded from HRL Laboratories website, HRL.com on Jul. 10, 2015.
"ERG Duocel® aluminum foam," product literature downloaded from ERG Aerospace website, ERGaerospace.com on Jul. 9, 2015.
http://www.ppgaerospace.com/getmedia/9a234ec3-1db9-48de-94f7-c212ac2ba705/SealCapFlyer.pdf.aspx, PPG Aerospace PRC Seal Caps, retrieved Sep. 7, 2016.
http://www.porex.com/files/documents/Porex-Battery-Vents-Letter---English, Porex Battery Vents, 2013.
Extended European Search Report for foreign counterpart EP Application No. 16173069, dated Nov. 17, 2016.
Product Literature for ERG Duocel Aluminum Foam, downloaded from ERO Aerospace website, www.ergaerospace.com/literature/erg_duocel.pdf, Jul. 9, 2015.
"HRL Researchers Develop World's Lightest Material," downloaded from HRL Laboratories website, www.hrl.com/hrlDocs/pressreleases/2011/prsRls_111117, Jul. 10, 2015.
Daniel J. Cowan et al., U.S. Appl. No. 15/964,340, filed Apr. 27, 2018.
Bart Stevens et al., U.S. Appl. No. 15/718,618, filed Sep. 28, 2017.
Sean Auffinger et al., U.S. Appl. No. 16/046,316, filed Jul. 26, 2018.
Bart Stevens et al., U.S. Appl. No. 15/960,835, filed Apr. 24, 2018.
Toulouse, Mixed Metal-Composite Assembly, May 2013.
Hutchinson Proprietary Document, Accessories: TP Nutcaps, 1 page.
Click Bond Cap dated May 16, 2016, 4 pgs.
Extended European Search Report for EP Application No. 18196707.6 dated Feb. 19, 2019.
Office Action for RU Application No. 2018127328/07 dated May 20, 2019.
EP Search Report for EP Application No. 19167831.7 dated Aug. 29, 2019.
EP Search Report for Application No. EP19166688 dated Aug. 29, 2019.

(56) References Cited

OTHER PUBLICATIONS

EP Office Action for Application No. 19166688.2 dated Sep. 20, 2019.
European Search Report for Application No. 19179944.4 dated Sep. 10, 2019.
Communication Pursuant to Article 94(3) dated Oct. 16, 2019.
European Search Report for EP Application No. EP19217717 dated May 8, 2020.
Drawings of Boeing Part Standard, BACC50AP, dated Feb. 2, 2017, 2 pgs.
Photographs of Boeing Proprietary, Zap Cap Further Screening Test Plan for 787 Fuel Tank Use, Mar. 24, 2016, 1 pg.
Extended European Search Report for EP Application No. 20176033.7 dated Oct. 23, 2020.
Extended EP Search Report for EP Application No. 19207962.2 dated Mar. 26, 2020.
Extended European Search Report for EP Application No. 21161373.2 dated Jul. 21, 2021.

* cited by examiner

FRICTION FIT ELECTROMAGNETIC EFFECT PROTECTION CAP SYSTEM

FIELD

This disclosure relates to an electromagnetic effect ("EME") protective seal cap and more particularly to an EME protective seal cap which encloses an end portion of a fastener with securement of the protective seal cap to a structure through which the end portion of the fastener extends.

BACKGROUND

Installation of protection seal caps, such as those constructed of polysulfide material or other materials commonly used for protective seal cap construction, can be time consuming for an installer. In addition, installation of the protective seal caps experience occurrences of defective installation, which require re-installation of the protective seal caps so as to meet the specifications for structures such as aircraft which utilize the protective seal caps. Since aircraft often contain numerous protective seal caps, improvement on time of installation and improvement on rate of quality installations, can provide value with respect to the installation of the protective seal caps at the time of fabrication of an aircraft and at the time of replacement of seal caps during maintenance of the aircraft.

The sealant used with the installation of the protective seal caps requires the installer to hold the protective seal cap in position on the structure to which the protective seal cap is to be secured. The installer holds the protective seal cap in place seating the protective seal cap to the structure until decompression of sealant has taken place. Without holding the protective seal cap for a sufficient time for seating and for decompression of the sealant to take place, the protective seal cap can experience liftoff of the protective seal cap with respect to the structure to which the protective seal cap is being secured and result in a defective installation. The installer normally needs to hold the protective seal cap in place on the structure to properly seat the protective seal cap to the structure and for decompression of the sealant to occur in order to enhance a rate of quality installations, which is time consuming and adds to the cost of installation.

When the installer is seating the protective seal cap on the structure and with the position of the protective seal cap in particular positions gravity can cause the protective seal cap to move resulting in failure rate of the installation increasing. Positions of the protective seal cap which would be prone to movement by gravitational forces include the protective seal cap being positioned in an upside down position, being positioned on a vertical surface or otherwise being positioned on an inclined surface. The effect of gravity on the protective seal cap can cause the protective seal cap to separate from the structure or move the protective seal cap relative to the end portion of the fastener the protective seal cap encloses, resulting in a defective installation once the installer is no longer present. Thus, there is a need to hold the protective seal cap for a sufficient amount of time without the presence of the installer so as to optimize the rate of quality installations and reduce the number of protective seal caps that may need to be re-installed.

The installation of protective seal caps can become particularly demanding at the time of maintenance, wherein the replacement of protective seal caps occur in more confined conditions and not in a more controlled environment of the factory. In addition, the maintenance replacement of protective seal caps also involves, at times, the entire removal of the previously installed sealant before re-installing of the protective seal cap. Thus, in maintenance replacement of protective seal caps, there is a need to provide a less challenging and time consuming way to hold the protective seal cap in position, regardless of the orientation of the position of the protective seal cap, to optimize the rate of successful installation and there is also a need to be able to hold the protective seal cap in position without necessarily having to remove all previously installed sealant that is secured, for example, to the fastener the protective seal cap is to enclose.

SUMMARY

An example includes a protective seal cap assembly for enclosing an end portion of a fastener extending through a structure, which includes a cap member. The cap member includes a sidewall which defines an opening and defines an interior space within the sidewall and aligned with the opening, wherein the sidewall defines a central axis. The cap member further includes at least one rib which extends away from sidewall within the interior space and extends in a direction along the central axis of the cap member.

Another example includes a method for holding a protective seal cap assembly against a structure enclosing an end portion of a fastener which extends through the structure. The method includes positioning a cap member over the end portion of the fastener and against the structure wherein the cap member includes a sidewall which defines an opening and defines an interior space within the sidewall and aligned with the opening, wherein the sidewall defines a central axis. The cap member further includes at least one rib which extends away from the sidewall within the interior space and extends in a direction along the central axis of the cap member. The method further includes deforming at a least a portion of the at least one rib creating interference friction between the at least one rib and the end portion of the fastener.

The features, functions, and advantages that have been discussed can be achieved independently in various embodiments or may be combined in yet other embodiments further details of which can be seen with reference to the following description and drawings.

DESCRIPTION

Figure 1:
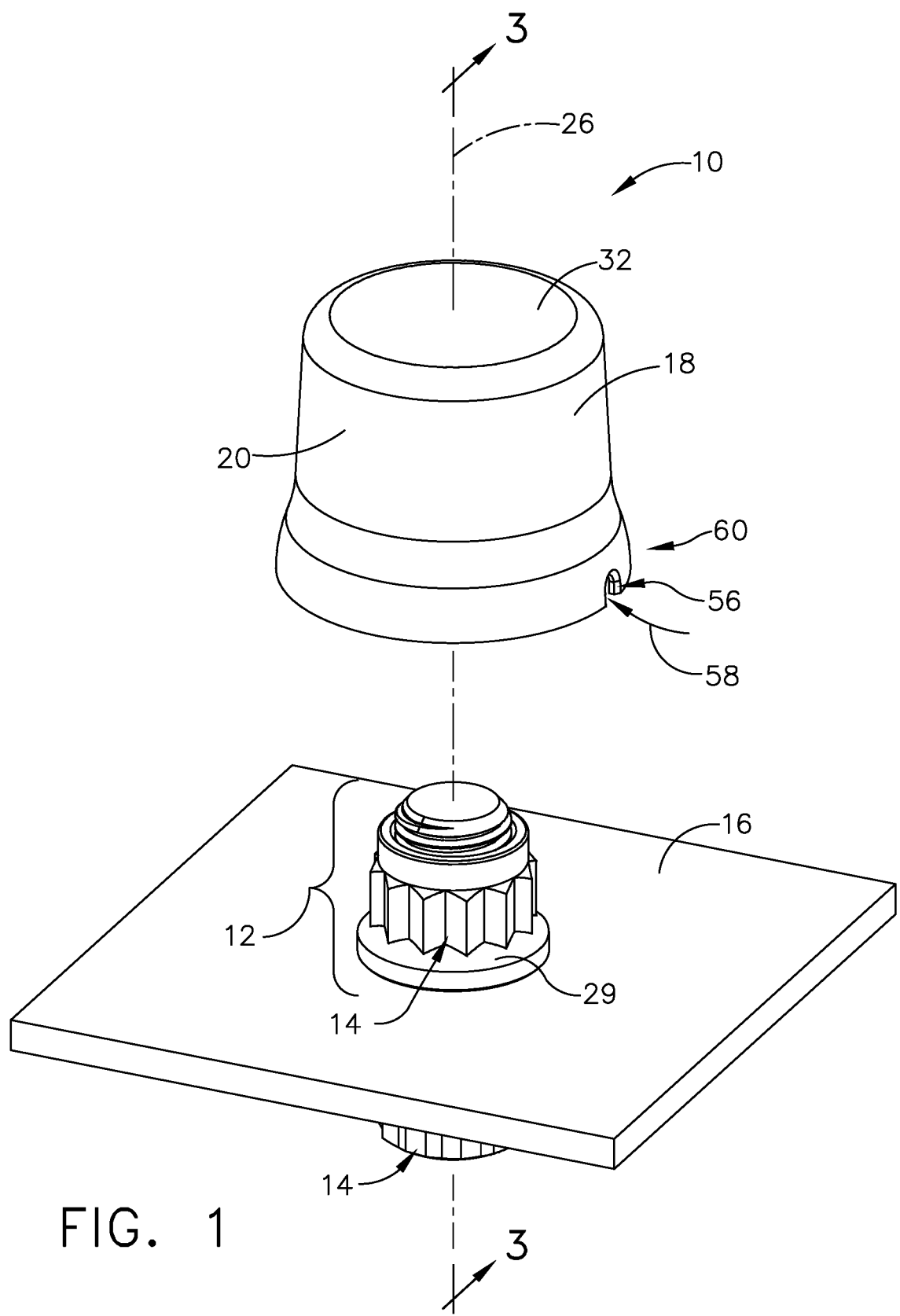
FIG. 1 is a perspective exploded view of the protective seal cap to be installed to enclose an end portion of a fastener and to secure to a structure through which the end portion of the fastener extends.
Figure 2:
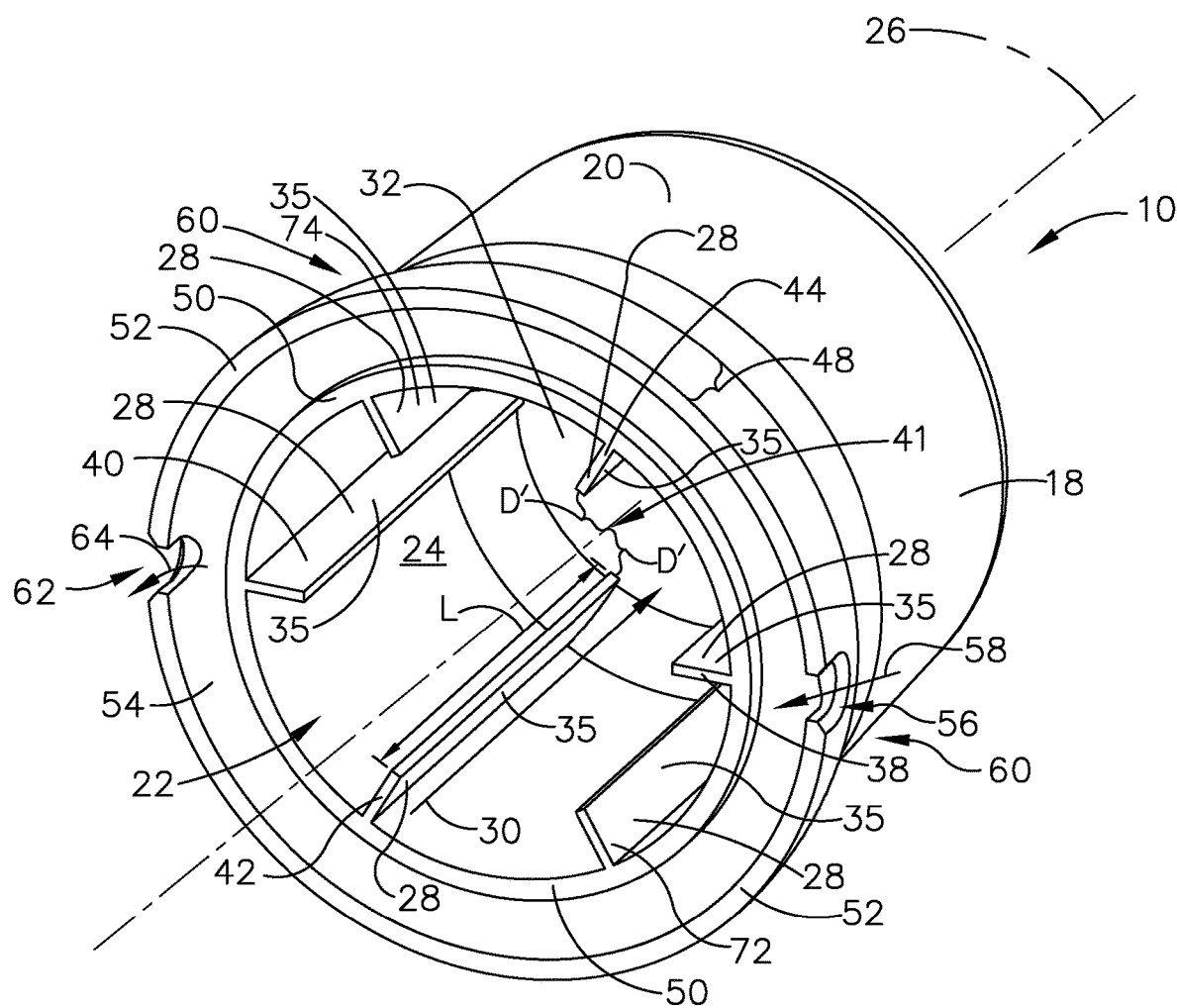
FIG. 2 is an enlarged bottom perspective view of the protective seal cap of FIG. 1.

In referring to FIGS. 1 and 2 protective seal cap assembly 10 for enclosing an end portion 12 of fastener 14 extending through structure 16 includes cap member 18. Cap member 18 includes sidewall 20 which defines an opening 22 and defines an interior space 24 within the sidewall 20 and aligned with opening 22. Sidewall 20 defines central axis 26. Cap member 18 further includes at least one rib 28 which extends away from sidewall 20 within interior space 24 and extends in direction 30 along central axis 26 of cap member 18.

At least one rib 28 has length L which extends between opening 22 and top wall 32 of cap member 18, which provides at least one rib 28 the opportunity to engage, as will be discussed, end portion 12 of fastener 14 at a wide range of locations within interior space 24 along central axis 26. In this example, at least one rib 28 extends linearly in direction 30 within interior space 24 parallel to central axis 26. At least one rib 28 is configured, as in this example, as wall 35, constructed of a resilient material such as thermoplastic, thermoset or such material that is configured with or without strengthening materials. As will be discussed, the resilient construction of at least one rib 28 allows at least one rib 28 to resiliently deform.

Figure 3:
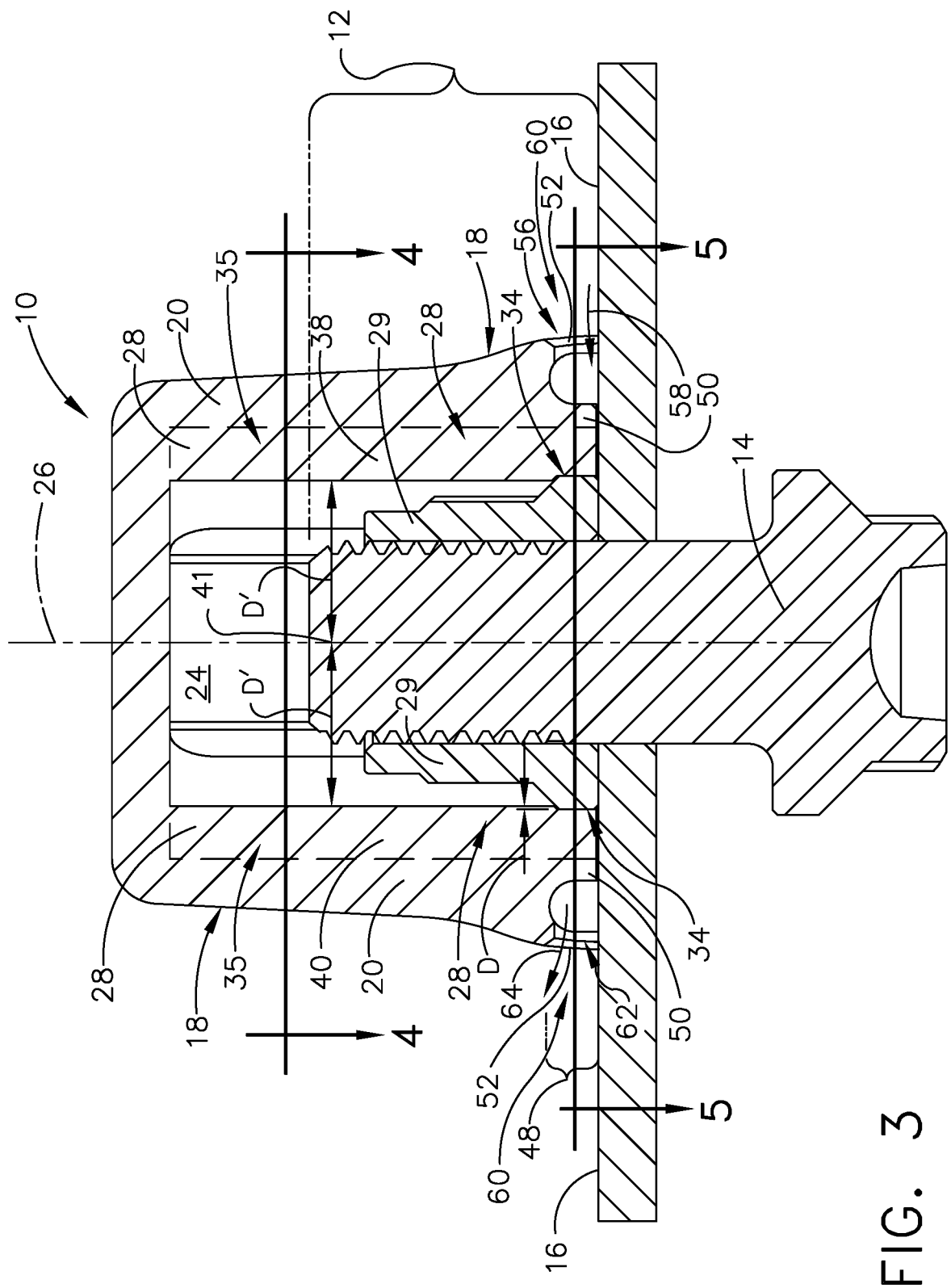
FIG. 3 is a cross section view along line 3-3 of FIG. 1, with the protective seal cap positioned on the structure.
Figure 4:
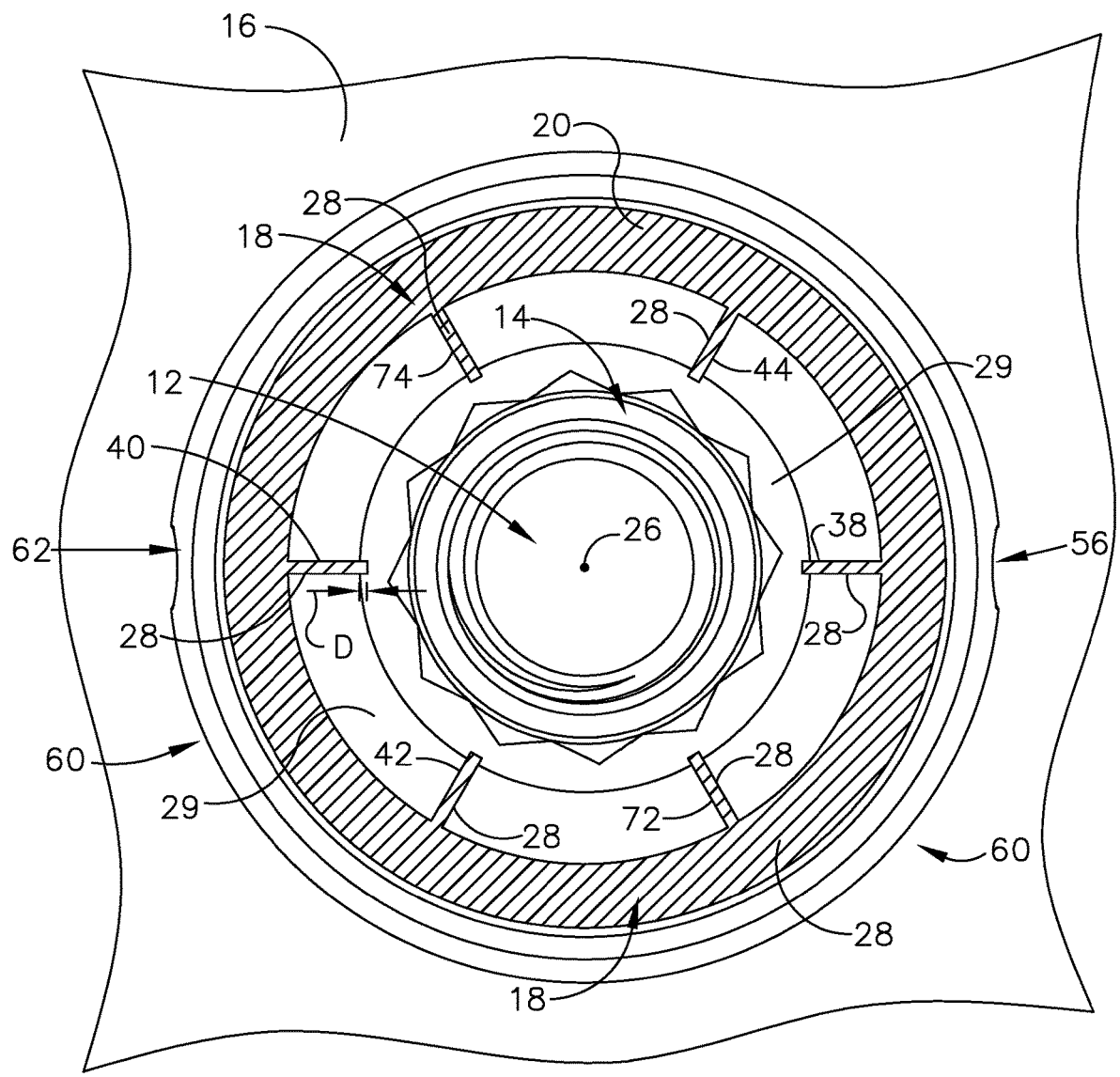
FIG. 4 is a cross section along line 4-4 as seen in FIG. 3.

With installing cap member 18 over end portion 12 of fastener 14 and with at least one rib 28 extending away from sidewall 20 of cap member 18 into interior space 24, as seen in FIGS. 2 and 3, end portion 12 of fastener 14 encounters and deforms portion 34 of wall 35 of at least one rib 28. Deformation of portion 34 of wall 35 is accomplished in this example with compression of portion 34 of wall 35 by distance D from a non-deformed condition with positioning end portion 12 of fastener 14 into interior space 24 of cap member 18 and end portion 12 encounters wall 35 and deforms portion 34 as installer pushes cap member against structure 16. Deformation of at least one rib 28 can take place by way imparting any number of forces onto the at least one rib 28 such as compression, flexing, bending, torsion or the like which resiliently changes the configuration of the at least one rib 28 out of its natural original configuration.

Figure 5:
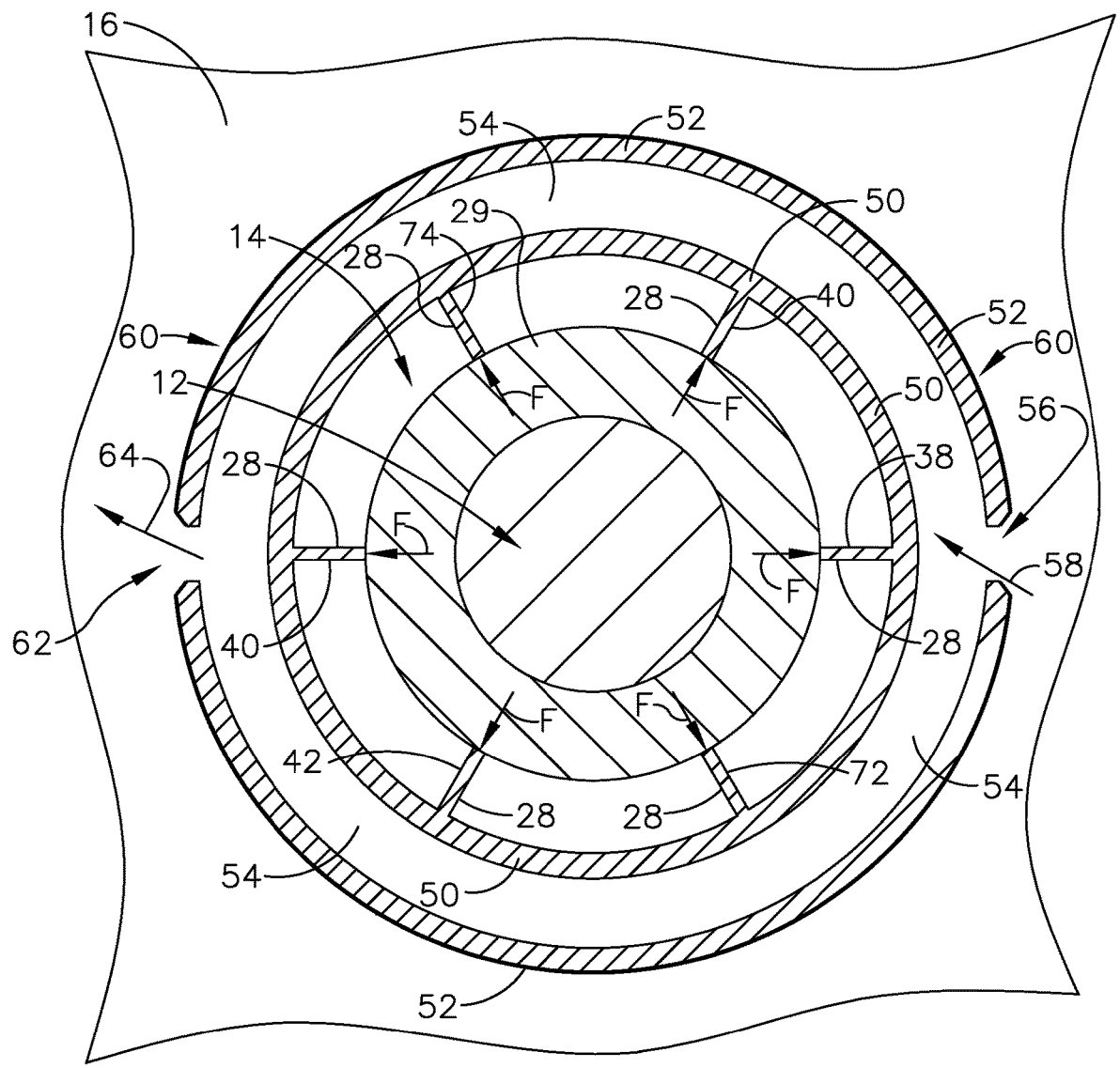
FIG. 5 is a cross section along line 5-5 as seen in FIG. 3.

At least one rib 28 is positioned extending away from sidewall 20 into interior space 24 of cap member 18 and prevents end portion 12 of fastener 14 from passing by at least one rib 28 without encountering at least one rib 28 and deforming portion 34 of wall 35 of at least one rib 28, in this example. At least one rib 28 can include multiple ribs which will also encounter end portion 12 of fastener 14 as installer moves cap member 18 against structure 16. With at least one rib 28, constructed of resilient material, deforming portion 34 of at least one rib member 28 as seen for example in FIG. 3, a distance D, a force F as seen in FIG. 5 is exerted by the at least one rib 28 against nut collar 29, in this example. With cap member 18 positioned on structure 16 and with at least one rib 28 having a deformed portion 34 and the at least one rib 28 is constructed of a resilient material, an interference fit is maintained between end portion 12 of fastener 14 and at least one rib 28. At least one rib 28, in this example as mentioned earlier, includes six ribs which are spaced about sidewall 20 and each experiences an interference fit with end portion 12 of fastener 14.

Figure 6:
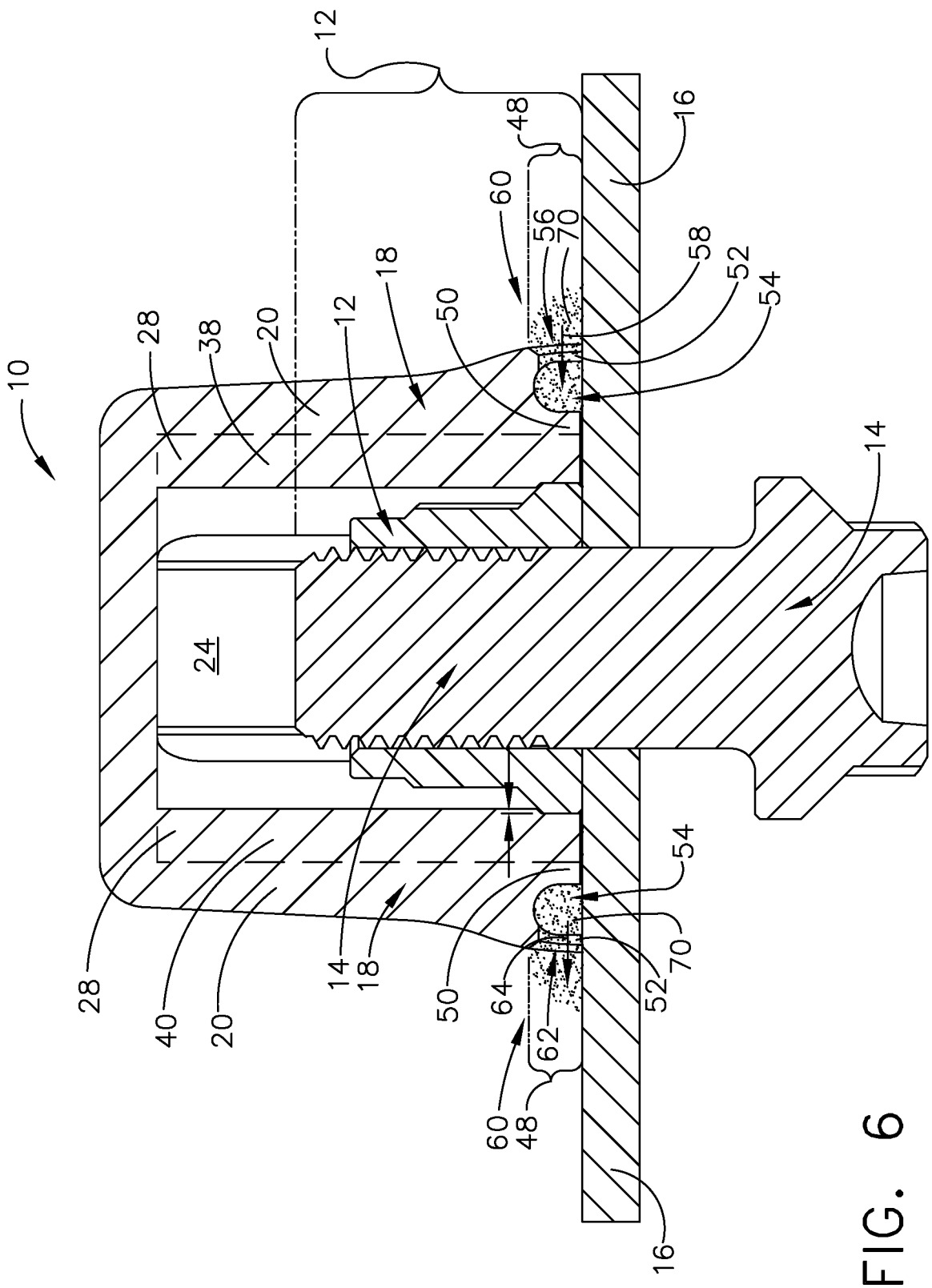
FIG. 6 is protective seal cap of FIG. 3 with sealant positioned so as to secure the protective cap seal to the structure.
Figure 7:
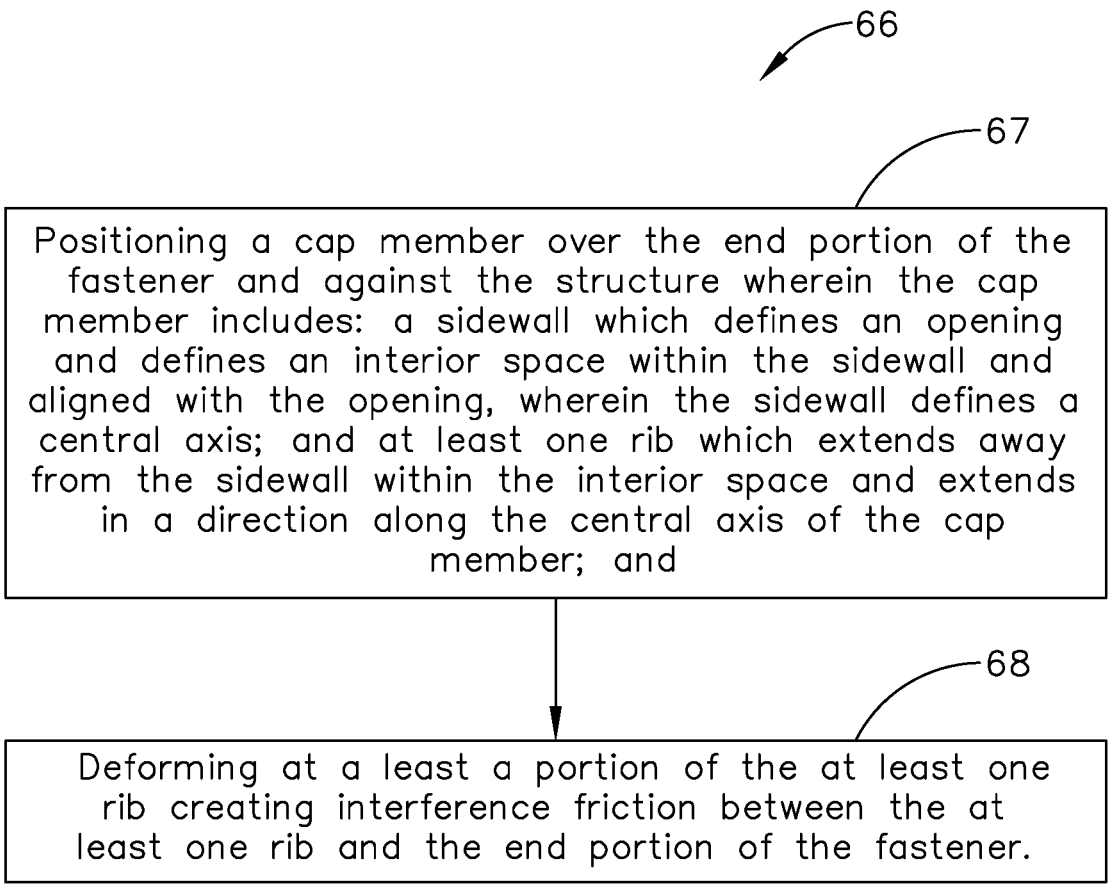
FIG. 7 is a flow chart of the method to install the protective seal cap assembly of FIG. 6.

The interference fit provides interference friction being established between at least one rib 28 and end portion 12 of fastener 14. In this example, the interference friction is between nut collar 29 and at least one rib 28. The interference friction maintains cap member 18 held in position against structure 16, which permits the installer to seal cap member 18 to structure 16 with a sealant 70, as seen in FIG. 6, and counter the effects of gravity for sealant 70 to cure regardless of the position of seal cap member 18, as mentioned earlier with cap member 18 positioned upside down on a surface of structure 16, on a vertical surface of structure 16 or on an inclined surface of structure 16. With cap member 18 held in position against structure 16 by the interference friction, this prevents cap member 18 from separating from structure 16 or moving relative to end portion 12 of fastener 14 positioned in interior space 24 of cap member 18 and reduces time of installation and increases a rate of quality installations.

At least one rib 28, in this example, includes, as seen in FIG. 2, first rib 38 and second rib 40 positioned on opposing sides of sidewall 20. First rib 38 and second rib 40 are spaced apart from one another across interior space 24. In this example, first rib 38 and second rib 40 are positioned an equal distance D' from central axis 26 at a predetermined point such as point 41 positioned on central axis 26, providing a symmetrical arrangement of the ribs positioned within cap member 18. Various numbers of ribs arrangements of ribs can be employed within cap member 18 whether symmetrical or nonsymmetrical in arrangement. In addition in this example, at least one rib 28 further includes third rib 42 and fourth rib 44 wherein third rib 42 is positioned spaced apart along sidewall 20 from first rib 38 and fourth rib 44 is positioned spaced apart along sidewall 20 from second rib 40. Third rib 42 and fourth rib 44 are space apart from one another across interior space 24.

In this example, first, second, third and fourth ribs 38, 40, 42 and 44 are positioned symmetrically about sidewall 20 extending from sidewall 20 and extending radially from sidewall 20 with respect to central axis 26. First through fourth ribs 38-44 experience substantially similar deformation as described earlier with respect to portion 34 of wall 35 of at least one rib 28 with positioning, as shown, in this example, of extending end portion 12 of fastener 14 into interior space 24 along central axis 26 encountering first through fourth ribs 38-44 and providing an interference fit between first through fourth ribs 38-44 and end portion 12 of fastener 14. As mentioned earlier, the interference fit creates interference friction between end portion 12 of fastener 14 and first through fourth ribs 38-44. The interference friction established sufficiently holds cap member 18 in position for sufficient cure of sealant 70 to take place regardless of the orientation of structure 16, as described above, and without requiring the presence of an installer so as to optimize the rate of quality installations of cap member 18.

In this example, protective seal cap assembly 10 is sealed to structure 16 with sealant 70. In referring to FIGS. 2, 3, 5 and 6, sidewall 20 of seal cap member 18 has end portion 48 which includes inner wall member 50 and outer wall member 52 which define channel 54, which extends about central axis 26. Outer wall member 52 defines first port 56 which extends through outer wall member 52 and defines flow path 58 between channel 54 and exterior 60 of outer wall member 52. In this example, outer wall member 52 defines second port 62 through outer wall member 52 positioned spaced apart from first port 56 on opposing sides of outer wall member 52. Similarly, second port 62 which extends through outer wall member 52 defines flow path 64 between channel 54 and exterior 60 of outer wall member 52. Sealant 70 is injected into one of first port 56 or second port 62 and extends through channel 54 such with sealant 70 exiting the other port than the port receiving the injection of the sealant, installer is provided an indication that channel contains sufficient sealant 70. At which point, the installer can stop injecting sealant and clean or taper sealant 70 which has exited one or both of first and second ports 56 and 62.

In referring to FIG. 6, method 66 for holding cap member 18 against a structure 16 and enclosing an end portion 12 of fastener 14 which extends through structure 16 includes step 67 of positioning cap member 18 over end portion 12 of fastener 14 and against structure 16 wherein cap member 18 includes sidewall 20 which defines opening 22 and defines interior space 24 within sidewall 20 aligned with opening 22. Sidewall 20 in this example defines central axis 26. Cap member 18 further includes at least one rib 28 which extends away from sidewall 20 within interior space 24 and extends in direction 30 along central axis 26 of cap member 18. Method 66 further includes step 68 of deforming at a least a portion 34, of wall 35 of this example, of at least one rib 28 creating interference friction between at least one rib 28 and end portion 12 of fastener 14.

As mentioned earlier, at least one rib 28 includes first rib 38 and second rib 40, as seen in FIGS. 2 and 3, positioned on opposing sides of sidewall 20 wherein at least a portion 34 of wall 35 of first rib 38 and at least a portion 34 second rib 40 are deformed with the interference fit between end portion 12 of fastener 14 and first rib 38 and second rib 40, as seen in FIG. 3. The interference fit creates interference friction between first rib 38 and end portion 12 of fastener 14 and between second rib 40 and end portion 12 of fastener 14, as earlier described with respect to at least one rib 28. With at least one rib 28 including first rib 38 and second rib 40 being constructed of a resilient material, the interference fit of end portion 12 of fastener 14 exerts a radial force F, as earlier mentioned and as seen in FIG. 5, against at least one rib 28 which maintains deformed portion 34 of first rib 38 and deformed portion 34 of second rib 40, for example, and provides the interference friction between end portion 12 of fastener 14 and first and second ribs 38, 40. This interference friction is created in this example with all of the at least one rib 28, which as mentioned above, includes six ribs positioned within cap member 18.

As mentioned earlier for sealing cap member 18 to structure 16, sidewall 20 of cap member 18 includes an end portion 48 which includes an inner wall member 50 and outer wall member 52, as seen in FIGS. 2, 3, 5 and 5. Inner wall member 50 and outer wall member 52 define channel 54 which extends about central axis 26. Outer wall member 52 defines first port 56 and second port 62 positioned spaced apart from one another on opposing sides of sidewall 20.

Method 66 further includes injecting sealant 70, as described earlier, into one of first port 56 or second port 62. With sealant 70 positioned within channel 54 and with interference fit between end portion 12 of fastener 14 and at least one rib 28 which includes, for example, first through fourth ribs 38-42, cap member 18 remains in position against structure 16 with sealant 70 decompressing and curing. With the interference friction between at least one rib 28 and end portion 12 of fastener 14, cap member 18 remains held in a proper position and provides a quality installation through completion of cure of sealant 70. In this example, at least one rib 28 further includes fifth and sixth ribs 72, 74 which extend from sidewall 20 within interior space 24 of cap member 18 and in this example are positioned symmetrically along with first through fourth ribs 38-42 within cap member 18 and provide interference friction similarly as provided by first through fourth ribs 38-42 with respect to end portion 12 of fastener 14.

While various embodiments have been described above, this disclosure is not intended to be limited thereto. Variations can be made to the disclosed embodiments that are still within the scope of the appended claims.

What is claimed:

1. A protective seal cap assembly for enclosing an end portion of a fastener extending through a structure, comprising:
   a cap member comprising:
      a sidewall which defines an opening and defines an interior space within the sidewall and aligned with the opening, wherein the sidewall defines a central axis;
      an end portion of the sidewall includes an inner wall member and outer wall member, such that the inner wall member and the outer wall member defines a channel, which extends about the central axis;
      a first port is defined by the outer wall member and a second port is defined by the outer wall member, such that the first port and the second port are space apart from each other about the central axis, and with the seal cap positioned on the structure, a first flow path positioned between the channel and an exterior of the outer wall member is bounded by the first port and the structure and a second flow path positioned between the channel and an exterior of the outer wall member is bounded by the second port and the structure; and
      at least one rib which extends away from the sidewall within the interior space and extends in a direction along the central axis of the cap member, wherein with the cap member positioned enclosing the end portion of the fastener, at least a portion of the at least one rib deforms and creates an interference friction between the at least one rib and the end portion of the fastener.

2. The protective seal cap assembly of claim 1, wherein the at least one rib has a length which extends between the opening and a top wall of the cap member.

3. The protective seal cap assembly of claim 1, wherein the at least one rib extends in the direction within the interior space parallel to the central axis.

4. The protective seal cap assembly of claim 1, wherein the at least one rib extends linearly.

5. The protective seal cap assembly of claim 1, wherein the at least one rib comprises a wall constructed of a resilient material.

6. The protective seal cap assembly of claim 1, wherein the at least one rib extends within the interior space of the cap member from an inner wall member of an end portion of the cap member.

7. The protective seal cap assembly of claim 1, wherein the at least one rib comprises a first rib and a second rib positioned on opposing sides of the sidewall.

8. The protective seal cap assembly of claim 7, wherein the first rib and the second rib are spaced apart from one another across the interior space.

9. The protective seal cap assembly of claim 8, wherein the first rib and the second rib are positioned an equal distance from the central axis at a predetermined point on the central axis.

10. The protective seal cap assembly of claim 7, further including:
   the at least one rib further comprises a third rib and a fourth rib;
   the third rib is positioned spaced apart along the sidewall from the first rib;
   the fourth rib is positioned spaced apart along the sidewall from the second rib; and
   the third rib and the fourth rib are spaced apart from one another across the interior space.

11. The protective seal cap assembly of claim 1, wherein the at least one rib extends radially from the sidewall with respect to the central axis.

12. The protective seal cap assembly of claim 1, wherein the sidewall has an end portion which comprises an inner wall member and an outer wall member.

13. The protective seal cap assembly of claim 12, wherein the inner wall member and the outer wall member define a channel which extends about the central axis.

14. The protective seal cap assembly of claim 13, wherein the outer wall member defines a first port through the outer wall member which defines a flow path between the channel and an exterior of the outer wall member.

15. The protective seal cap assembly of claim 14, further includes the outer wall member defines a second port through the outer wall member positioned spaced apart from first port on opposing sides of the outer wall member.

16. A method for holding a protective seal cap assembly against a structure enclosing an end portion of a fastener which extends through the structure, comprising the steps of:
 positioning a cap member over the end portion of the fastener and against the structure wherein the cap member includes:
  a sidewall which defines an opening and defines an interior space within the sidewall and aligned with the opening, wherein the sidewall defines a central axis;
  an end portion of the sidewall includes an inner wall member and outer wall member, such that the inner wall member and the outer wall member defines a channel, which extends about the central axis;
  a first port is defined by the outer wall member and a second port is defined by the outer wall member, such that the first port and the second port are space apart from each other about the central axis, and with the seal cap positioned on the structure, a first flow path positioned between the channel and an exterior of the outer wall member is bounded by the first port and the structure and a second flow path positioned between the channel and an exterior of the outer wall member is bounded by the second port and the structure; and
  at least one rib which extends away from the sidewall within the interior space and extends in a direction along the central axis of the cap member; and
 deforming at a least a portion of the at least one rib creating interference friction between the at least one rib and the end portion of the fastener.

17. The method of claim 16, wherein the at least one rib includes a first rib and second rib positioned on opposing sides of the sidewall wherein at least a portion of the first rib and a second portion of second rib creating interference friction between the first rib and the end portion of the fastener and between the second rib and the end portion of the fastener.

18. The method of claim 16, wherein the positioning of the cap member further includes positioning the cap member against a structure through which the end portion of the fastener extends.

19. The method of claim 18, wherein the sidewall has an end portion which comprises an inner wall member and an outer wall member, wherein:
 the inner wall member and the outer wall member define a channel which extends about the central axis; and
 the outer wall member defines a first port and a second port positioned spaced apart from one another on opposing sides of the sidewall.

20. The method of claim 19, further including injecting a sealant into one of the first port or the second port.

21. The method of claim 16, wherein the at least one rib extends radially from the sidewall with respect to the central axis.

\* \* \* \* \*